United States Patent Office 3,386,979
Patented June 4, 1968

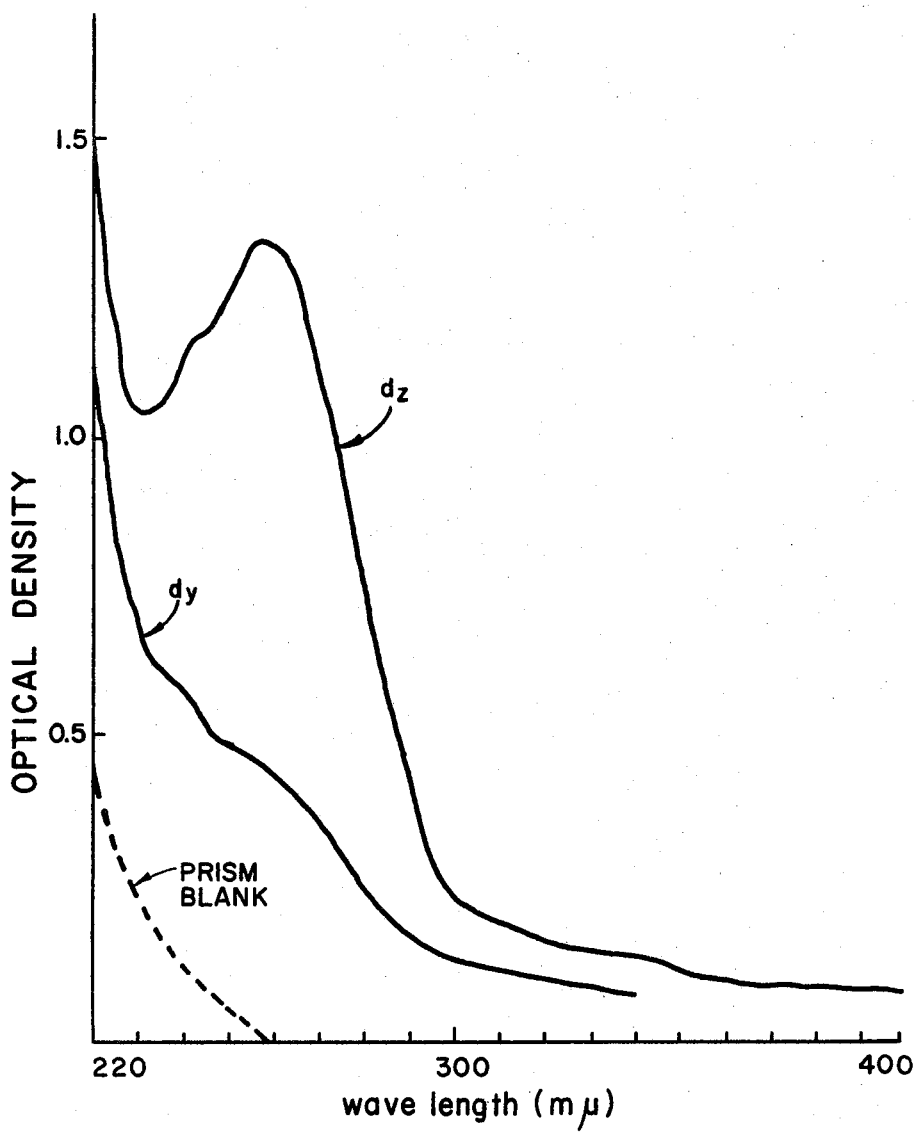

3,386,979
ULTRAVIOLET LIGHT POLARIZERS FROM VINYL MONOMERS POLYMERIZED IN THE PRESENCE OF POLYPHENYL CHAIN TRANSFER AGENTS
Howard C. Haas, Arlington, Mass., assignor to Polaroid Corporation, Cambridge, Mass., a corporation of Delaware
Continuation-in-part of application Ser. No. 154,338, Nov. 22, 1961. This application May 15, 1963, Ser. No. 280,578
10 Claims. (Cl. 260—89.1)

This invention relates to light polarizers and to methods for making the same.

This application is a continuation-in-part of application Ser. No. 154,338, filed Nov. 22, 1961, and now abandoned.

This invention has for its primary objects novel light-polarizing devices and novel methods for making the same.

One object of this invention is to provide novel, colorless, visually transparent light polarizers for the ultraviolent region.

Another object is to provide a novel light polarizer comprising a polymer prepared by polymerizing a vinyl monomer in the presence of a polyphenyl or substituted polyphenyl.

Still another object is to provide a novel process for the manufacture of light polarizers of the character described wherein the molecules of said polymer are oriented to substantial alignment.

Other objects of the invention will in part be obvious and will in part appear hereinafter.

The invention accordingly comprises the process involving the several steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 shows the ultraviolet dichroic behavior of the polymer prepared in accordance with this invention.

In the past, useful light polarizers of the ultraviolet region have comprised oriented materials containing therein a suitable dichroic material. Examples of such polarizers are disclosed in the copending U.S. applications of Albert S. Makas, Ser. No. 117,827, filed June 19, 1961, now Patent No. 3,254,561 and Ser. No. 128,675, filed Aug. 2, 1961, now Patent No. 3,276,316.

It has been found in the present invention that an ultraviolet light polarizer can be prepared by molecularly orienting a polymeric sheet comprising a linear polymer prepared by the polymerization of a vinyl monomer in the presence of an aromatic hydrocarbon, e.g., diphenyl, which absorbs incident radiation in the ultraviolet region.

The light polarizers of this invention may be prepared by polymerizing a vinyl monomer in the presence of a polyphenyl ultraviolet absorbing dichroic compound, preferably diphenyl. A film is cast from the resulting polymer and molecularly oriented, as by stretching.

It should be understood that the term "polyphenyl," as used herein, is intended to include substituted polyphenyls, e.g., alkyl substituted polyphenyls.

The light polarizer of the present invention exhibits positive dichroism for ultraviolet radiation, that is, the absorption axis for the incident ultraviolet light is parallel to the stretch axis of the polymeric sheet.

In a preferred embodiment, vinyl acetate is polymerized in the presence of diphenyl. The resulting polymer is isolated and the acetate groups are hydrolyzed. A film is cast and stretched, and the polymer is then allowed to harden in the extended condition. The dichroic properties of the resulting light polarizer were then measured on a Cary spectrodensitometer with a Glan-Foucault prism.

The following nonlimiting examples illustrate the preparation of light polarizers within this invention.

EXAMPLE 1

A 50–50 mixture by weight of vinyl acetate and diphenyl and 0.2% of azobisisobutyronitrile were heated at 80° C., for 4 days in a glass ampoule sealed under vacuum. The polymer was isolated by precipitation in hexane and then purified by several precipitations from acetone into hexane to remove any unreacted diphenyl. The acetate groups on the polymer were then hydrolyzed by refluxing for 20 min. in methanol containing sodium methoxide. The resulting polymer was purified by several reprecipitations from water into methanol. A film was then cast on glass, dried and stretched to five times its original length to a 1 mil. thickness. By measurement on a Cary spectrodensitometer with a Glan-Foucault prism, the polarizer exhibited a dichroic ratio of 2.7 at 258 m$\mu$.

EXAMPLE 2

A vinyl acetate-diphenyl polymer was prepared and hydrolyzed, as in Example 1. The polymer was then diluted on a 1 to 1 ratio by weight with pure polyvinyl alcohol. A film was then cast and a polarizer was prepared and measured by the same procedure described in Example 1. The polarizer exhibited a dichroic ratio of 3.14 at 258 m$\mu$ and 2.40 at 242 m$\mu$.

EXAMPLE 3

Vinyl chloride and diphenyl (2 to 1 ratio by weight of the monomers) were heated for two days at 60–70° C., with 0.2% of azobisisobutyronitrile in a glass lined stainless steel bomb. The resulting solid was dissolved in a tetrahydrofuran and then precipitated by hexane. The polymer was purified by several reprecipitations. A film was then cast from tetrahydrofuran, dried and stretched. The resulting polarizer exhibited a dichroic ratio of 1.5 at 255 m$\mu$. The polarizer thus prepared shows substantially higher dichroism in the ultraviolet region than could be attributed to vinyl chloride alone.

It had been reported that in the polymerization of vinyl acetate in the presence of benzene, the benzene acts as a monomer and a linear copolymer is formed containing recurring phenylene units (Journal of the American Chemical Society, volume 82, p. 4780–5, 1960). Utilizing this principle, a vinyl monomer was polymerized in the presence of a polyphenyl compound in order to prepare a copolymer containing a dichroic material as part of the polymeric chain. The polymer when oriented, as by stretching, absorbs incident ultraviolet radiation whose electric vector is parallel to the stretch axis and transmits, substantially unaffected, incident ultraviolet radiation vibrating at a 90° angle to the stretch axis.

However, the theory which held benzene to be a comonomer has been recently refuted (Monatsh, Chem., 92, p. 1100, 1961 and J. Am. Chem. Soc., 84, p. 4986, 1962). Accordingly, it has also been found that the polymer prepared for the novel polarizer of the present invention is not a copolymer but rather a vinyl polymer containing polyphenyl residues. Polyphenyls were found to act as chain transfer agents and not as a comonomer as was believed initially.

In order to prove that the vinyl polymer chain transfers with polyphenyl rather than copolymerizes, a study of the polymerization system involving vinyl acetate and diphenyl was undertaken.

Pure diphenyl in alcohol solution exhibits a single absorption peak at 247 m$\mu$ with an extinction coefficient of about $2\times 10^4$. The ultraviolet spectrum of an aqueous solution of PVA containing diphenyl residues (prepared from a polyvinyl acetate polymerized in the presence of diphenyl according to the procedure set forth in Example 1) has two absorption maxima at about 242 and 251 m$\mu$. Since radical attack, at least by phenyl radicals, has been shown to occur at all three ring positions of diphenyl (J. Chem. Soc., 794, 1954), the presence of more than one maximum is not unexpected. The ultraviolet dichroic behavior of a 1 mil oriented film of this polyvinyl alcohol diluted one to one with a commercial polyvinyl alcohol sold under the trade name Gelvatol 2/75, by Shawinigan Resins Co., Springfield, Mass., is presented in FIGURE 1 wherein $d_z$ represents the curve obtained when the stretch direction of the polarizer is parallel to the $e$ vector of the radiation and $d_y$ represents the curve obtained when the stretch direction of the polarizer is perpendicular to the $e$ vector of the radiation. Dilution with normal PVA was desirable for reducing the optical density in the 250 m$\mu$ region. The best results obtained yielded dichroic ratios of 2.40 and 3.14 respectively for the 242 and 258 m$\mu$ bands. The change from aqueous solution to PVA film resulted in a slight shift of the absorption maximum of the lower frequency band. After several polymerizations of vinyl acetate in the presence of diphenyl, it was definitely established that diphenyl residues are present in the polymer, that they can be detected and estimated by ultraviolet absorption spectra, and that several species are present since diphenyl and mono or dialkyl substituted biphenyls all show a single absorption maximum in this range.

To study the polymerization of vinyl acetate in the presence of diphenyl, the polymerizations described in Table I were carried out. The catalyst, $\alpha,\alpha'$-azobiscyclohexanecarbonitrile was prepared according to the procedure of Thiele and Heuser, Ann, 290, 1 (1896) and Dox, J. Am. Chem. Soc., 47, 1473 (1925).

following equation found in J. Am. Chem. Soc., 84, 4780 (1960).

$$\log \overline{P}_n = 3.24 + 1.40 \log [\eta] \quad (1)$$

TABLE II

| Sample | [$\eta$], acetone, 25° C. | $\overline{P}_n$ |
| --- | --- | --- |
| 2 | 1.04 | 1,836 |
| 3 | 0.87 | 1,512 |
| 4 | 0.73 | 1,269 |
| 5 | 0.68 | 1,182 |

Employing the conventional kinetic scheme (described in Butterworth's Scientific Publications, London, 1958, p. 233), which includes chain transfer with monomer and solvent but excludes termination reactions involving solvent radicals, the chain transfer constant for diphenyl was obtained from Equation 2 by plotting $1/P_n$ vs. $S/M$ where $x$ is the fraction of termination reactions occurring $$\frac{1}{\overline{P}_n} = \frac{1+x}{k_2[M]} \left(\frac{fk_1 [\text{Cat}]}{2}\right)^{1/2} (_3+k_3')^{1/2} + \frac{k_8}{k_2} + \frac{k_4[S]}{k_2[M]} \quad (2)$$

by disproportionation, $f$ is the fraction of catalyst radicals initiating polymerization, rate constants $k_2$, $k_1$, $k_3'$, $k_8$ and $k_4$ are respectively for propagation, initiation, termination by combination, termination by disproportionation, chain transfer to monomer and chain transfer to solvent. The [Cat] ½/M ratio was maintained constant for all values of $S/M$ (see Table I) so that the first term on the right hand side of Equation 2 remains constant. A chain transfer constant, $k_4/k_2$ of $6.4\times 10^{-4}$ was obtained from the above-mentioned plot.

The polyvinyl acetates employed in the viscosity measurements were recovered by evaporation of the acetone and converted to polyvinyl alcohol by alkaline alcoholysis, care being taken to recover all the polymer. Quantitative ultraviolet absorption spectra were then obtained on aqueous solutions of the five samples. In Table III, the

TABLE I.—POLYMERIZATION OF VINYL ACETATE IN THE PRESENCE OF DIPHENYL, 59.6° C.

| Tube | Vinyl Acetate | | Diphenyl | | Catalyst, M./l.$^{-1}\times 10^2$ | Polymerization Time, min. | Polyvinyl Acetate Yield, g. |
| --- | --- | --- | --- | --- | --- | --- | --- |
| | G./25 cc. | M./l.$^{-1}$ | G./25 cc. | M./l.$^{-1}$ | | | |
| 1 | 22.083 | 10.26 | 0 | 0 | 1.00 | 108 | 1.2198 |
| 2 | 19.463 | 9.04 | 3.00 | 0.78 | 0.750 | 397 | 0.8552 |
| 3 | 16.838 | 7.83 | 6.00 | 1.56 | 0.580 | 953 | 0.7843 |
| 4 | 14.225 | 6.61 | 9.00 | 2.33 | 0.415 | 2,308 | 0.9950 |
| 5 | 11.630 | 5.40 | 12.00 | 3.12 | 0.278 | 5,328 | 1.0753 |

Polymerizations were carried out at 59.6° C. in sealed glass tubes which were carefully evacuated prior to sealing. The mixtures were made up by placing the biphenyl in a 25 cc. volumetric flask, adding the catalyst and diluting to volume at 59.6° C. with vinyl acetate monomer.

Viscosity measurements were made on the polyvinyl acetates at 25° C. with acetone as the solvent and a Cannon-Ostwald-Fenske viscometer. In Table II, the intrinsic viscosities are recorded together with the number average degrees of polymerization calculated from the spectral data and the chain transfer constant for diphenyl as calculated from a copolymerization type treatment in which one of the $r$'s is zero are given.

$$\frac{dM}{ds} = 1 + \frac{k_2[M]}{k_4[S]} \approx \frac{k_2[M]}{k_4[S]} \quad (3)$$

TABLE III

| PVA Sample | PVA, g./10 cc. | Optical[1] Density at 254 m$\mu$ | Diphenyl Residues, Moles/ 10 cc.$\times 10^6$ | Diphenyl Residues, Mole/Mole of PVAc Chains | $k_4/k_2$ $\times 10^4$ |
| --- | --- | --- | --- | --- | --- |
| 1 | 0.2217 | [2] 0.44 | 0 | 0 | |
| 2 | 0.1886 | 1.54 | 0.562 | 0.24 | 15.2 |
| 3 | 0.1590 | 2.22 | 0.914 | 0.38 | 12.7 |
| 4 | 0.1106 | 1.90 | 0.808 | 0.41 | 9.15 |
| 5 | 0.1144 | 2.56 | 1.12 | 0.51 | 7.45 |

[1] Cell pathlength is 1 cm.
[2] Blank.

With regard to Table III, although there are two maxima in the ultraviolet, they are so close together that the assumption of a single maximum at 254 m$\mu$ introduces very little error. Optical density measurements for samples 2 through 5 were corrected for absorption at 254 mμ by diphenyl free polyvinyl alcohol (sample 1). An extinction coefficient of 20,800 was used to calculate the diphenyl content. This is a reasonable value for 2 of the 3 possible monoalkyl biphenyls and for 4 of the 6 dialkyl biphenyls in which both rings are substituted and is somewhat high for the other mono or di substituted possibilities. Therefore, there might be a tendency to minimize slightly the amount of biphenyl residues present. The variation in $k_4/k_2$ values of Table III cannot be accounted for but they are all certainly in reasonable agreement with the value of $6.4 \times 10^{-4}$ obtained from $\overline{P}_n$ measurements. The results imply that diphenyl is behaving as a chain transfer agent and not as a comonomer.

Although the kinetic data are limited, it has been interpreted in light of Kice's scheme for retarded polymerization, J. Am. Chem. Soc., 76, 6274, (1954). The symbolism of Peebles, Clark and Stockmayer, J. Am. Chem. Soc., 84, 4780 (1960), has been used. The interpretation yielded the following equation:

$$\frac{Q_o^2}{Q_s^2} = 1 + \frac{S/M}{\alpha + BQ_s/M} \quad (4)$$

where $$Q \equiv -\frac{d \ln M}{dt}, \quad \alpha = \frac{k_3 k_5}{k_4 k_6}, \quad \beta = \frac{k_3}{k_2 k_4}, \quad Q_o = k_2 \left(\frac{k_1 I}{k_3}\right)^{1/2}$$

and the subscript $o$ or $s$ denotes the absence or presence of solvent. The rate constants have the same meaning as before (Equation 2) and, in addition, $k_5$ is for reinitiation by solvent radicals and $k_6$ for termination by solvent radicals. Solvent dimerization, $k_7$, has been neglected in the treatment.

From the data of Table I, $Q_o$ at 59.6° C. was found to be $0.5 \times 10^{-3}$ min.$^{-1}$. This value is lower than that obtained by Peebles et al., so it was necessary to establish a new dependence of $Q_o$ on initiator concentration. This is $$Q_o = 0.5 \times 10^{-2} I^{1/2} \quad (5)$$

Employing Equation 5 and the data of Table I, values of $Q_o$ and $Q_s$ for various initiator concentrations were calculated (Table IV) and from a plot of

TABLE IV

| Sample | Cat $^{1/2} \times 10^2$ | $Q_o \times 10^3$ | $Q_s \times 10^4$ |
|---|---|---|---|
| 2 | 8.68 | 0.43 | 1.01 |
| 3 | 7.64 | 0.38 | 0.51 |
| 4 | 6.46 | 0.32 | 0.31 |
| 5 | 5.29 | 0.26 | 0.18 |

$Q_s^2 SM^{-1}(Q_o^2-Q_s^2)^{-1}$ vs. $Q_s/M$ a value for $\beta$ of 267 was obtained from the slope. With $k_1 = 2.1 \times 10^{-5}$ min.$^{-1}$ for azobiscyclohexane carbonitrile at 59.6° C., it can be easily shown that $k_4/k_2 = 0.3 \times 10^{-4}$. Unlike the results obtained by Peebles et al., J. Am. Chem. Soc. 84, 4780 (1960), for benzene, this kinetic transfer constant is smaller than values obtained from the $\overline{P}_n$ and analytical measurements. The result of the kinetic data lends credence to the viewpoint that diphenyl is not copolymerizing with vinyl acetate.

In a recent publication, J. Am. Chem. Soc., 84, 4986 (1962), based on the ethylene-benzene system, it was concluded that the free radical copolymerization of benzene is impossible. It is also stated that benzene produces essentially no retardation in the rate of polymerization of ethylene and argue in favor of the transfer step as being $$R \cdot + C_6H_6 \rightarrow RH + C_6H_5 \cdot \quad (6)$$

The polymerization of vinyl acetate by azonitrile catalysts should result in a rate equation involving M. Cat$^{1/2}$. The data of Table I readily demonstrate that diphenyl retards the rate of polymerization of vinyl acetate. It is therefore difficult to understand how in the vinyl acetate system, the transfer step can be of the type described by Equation 5 since $C_6H_5 \cdot$ or

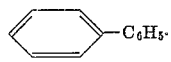

being active radicals, should not result in much rate diminution. On the other hand, the postulate that the growing chain does add to diphenyl to produce a radical which is resonance stabilized, has a longer lifetime, and finally either ejects H· or abstracts H· from vinyl acetate, is more in accord with the facts.

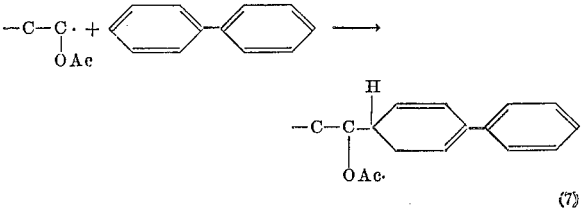

(7)

From the foregoing study, it can be reasonably assumed that the polyphenyl is present in the polymer as the aromatic species since one transfer mechanism (loss of H·) produces that directly and phenylcyclohexadiene types should be readily reoxidized by air during the prolonged workup.

The novel process of this invention permits the preparation of a light polarizer having a desired absorption band by the selection of a particular dichroic polyphenyl compound to be present during the polymerization of the vinyl monomer. For example, diphenyl produces a polarizer in the 250 mμ region and higher polyphenyls, e.g., terphenyl, quaterphenyl, produce polarizers with dichroism at corresponding longer wavelengths.

By means of this invention, it is possible to prepare polarizers for a wide range of the ultraviolet region.

The quantity of polyphenyl associated with the vinyl polymer is not critical since the relative amount can be readily controlled by dilution of the polymer with pure vinyl polymer. The higher the ratio of polyphenyl units associated with the polymer, the higher the extinction coefficient, but the thinner the film has to be to provide a polarizer with reasonable transmittance. Therefore, the preferred procedure would be to prepare a polymer initially with a relatively high ratio of polyphenyl to vinyl polymer. From this starting point, a film of any desired composition and thickness can be obtained by appropriate dilution and stretching. The process of this invention, therefore, permits great flexibility and control in the composition of the polymer.

The novel light polarizers of this invention are colorless, visually transparent sheets that absorb incident ultraviolet light, whose electric vector is vibrating parallel to the axis of orientation, and transmits substantially unaffected ultraviolet light whose electric vector is at a 90° angle to the angle of orientation.

It may also be desirable to modify the polarizer of this invention in some manner to improve its mechanical stability, for example, by cross-linking the polymer, as by borating, to render the polymer more water and heat insensitive. The process of borating a light-polarizing film is described in U.S. Patents Nos. 2,554,850, issued May 29, 1951 and 2,445,581, issued July 20, 1948. The polarizers of this invention may also be coated or bonded to a transparent support to provide protection against physical damage.

A polarizer of the present invention may also be combined with a polarizer of the visible spectral regions in order to provide the combined effects of plane polarized light components in both the visible and ultraviolet regions. Such a combination visible-ultraviolet polarizer may be prepared by placing a polarizer of this invention and a visible polarizer in contiguous relationship to each other, or by incorporating a dichroic dye for the visible region into the ultraviolet polarizer of this invention at a suitable point in the preparation of the polarizer.

It should be understood that in any modification made in the ultraviolet polarizers of this invention, for example, bonding to a support, combining with a visible polarizer, etc., care must be taken that no material or treatment is used that will significantly affect the absorption of radiation or impair the efficiency in the effective range of the polarizer.

Since certain changes may be made in the above products and processes without departing from the scope of the invention herein involved, it is intended that all matter contained in the above description or shown in the accompanying drawing shall be interpreted as illustrative and not in a limiting sense.

What is claimed is:

1. An ultraviolet light polarizer comprising a molecularly oriented film comprising a polymer prepared by polymerizing a vinyl monomer selected from the group consisting of vinyl chloride and vinyl acetate in the presence of a free radical catalyst and a polyphenyl chain transfer agent comprising less than five phenylene groups.

2. A product as defined in claim 1 wherein said vinyl monomer is vinyl acetate and said polymer is hydrolyzed at some time prior to orienting.

3. A product as defined in claim 1 wherein said vinyl monomer is vinyl chloride.

4. A product as defined in claim 1 wherein said polyphenyl chain transfer agent is diphenyl.

5. The process of forming an ultraviolet light polarizer comprising the steps of polymerizing a vinyl monomer selected from the group consisting of vinyl chloride and vinyl acetate in the presence of a free radical catalyst and a polyphenyl chain transfer agent comprising less than five phenylene groups, casting a film of the resulting polymer, and orienting said film to substantial molecular alignment.

6. A process as defined in claim 5 wherein said vinyl monomer is vinyl acetate and said polymer is hydrolyzed at some time prior to said orienting.

7. A process as defined in claim 5 wherein said vinyl monomer is vinyl chloride.

8. A process as defined in claim 5 wherein said polyphenyl chain transfer agent is diphenyl.

9. An ultraviolet light polarizer comprising a molecularly oriented film comprising a vinyl polymer selected from the group consisting of polyvinyl chloride and polyvinyl alcohol containing linear polyphenyl chain terminating groups comprising less than five phenylene groups.

10. A product as defined in claim 9 wherein said vinyl polymer is polyvinyl alcohol.

References Cited

UNITED STATES PATENTS

| | | | |
|---|---|---|---|
| 2,328,903 | 9/1943 | Heymann | 8—4 |
| 2,400,877 | 5/1946 | Dreyer | 117—124 |
| 3,254,562 | 6/1966 | Blout et al. | 88—65 |

JOSEPH L. SCHOFER, *Primary Examiner.*

M. L. BERCH, *Assistant Examiner.*

UNITED STATES PATENT OFFICE
CERTIFICATE OF CORRECTION

Patent No. 3,386,979          Dated June 4, 1968

Inventor(s) Howard C. Haas

It is certified that error appears in the above-identified patent and that said Letters Patent are hereby corrected as shown below:

Column 7, claim 1, line 20 after "a" insert --linear--.

Column 8, claim 5, line 3 after "a" insert --linear--.

Signed and sealed this 2nd day of May 1972.

(SEAL)
Attest:

EDWARD M. FLETCHER, JR.          ROBERT GOTTSCHALK
Attesting Officer          Commissioner of Patents